(12) United States Patent
Palmer

(10) Patent No.: US 9,594,255 B2
(45) Date of Patent: Mar. 14, 2017

(54) STEREOSCOPIC 3D PROJECTION SYSTEM WITH IMPROVED LEVEL OF OPTICAL LIGHT EFFICIENCY

(71) Applicant: Volfoni R&D EURL, Villeneuve-Loubet (FR)

(72) Inventor: Stephen Palmer, Borlänge (SE)

(73) Assignee: Volfoni R&D Eurl, Villeneuve-Loubet (FR)

( * ) Notice: Subject to any disclaimer, the term of this patent is extended or adjusted under 35 U.S.C. 154(b) by 75 days.

(21) Appl. No.: 14/750,227

(22) Filed: Jun. 25, 2015

(65) Prior Publication Data

US 2016/0381352 A1    Dec. 29, 2016

(51) Int. Cl.

| | |
|---|---|
| G02B 27/26 | (2006.01) |
| H04N 13/04 | (2006.01) |
| G02B 5/30 | (2006.01) |
| G03B 21/56 | (2006.01) |
| G02B 27/28 | (2006.01) |
| G02F 1/13363 | (2006.01) |

(52) U.S. Cl.
CPC ........... *G02B 27/26* (2013.01); *G02B 5/3041* (2013.01); *G02B 5/3083* (2013.01); *G02B 27/283* (2013.01); *G02F 1/13363* (2013.01); *G03B 21/56* (2013.01); *H04N 13/0434* (2013.01); *H04N 13/0438* (2013.01); *H04N 13/0459* (2013.01)

(58) Field of Classification Search
CPC ...... G02B 27/26; G02B 27/22; G02B 5/3083; G02B 2027/0118; G02B 5/30; G02B 27/0018; G03B 35/26; G03B 35/22; H04N 13/0434; H04N 9/3167; G02F 1/13363; G02F 2001/133635; G02F 2001/133638

See application file for complete search history.

(56) References Cited

U.S. PATENT DOCUMENTS 7,511,792 B2 * 3/2009 Chang ................. G02F 1/13363
  349/102
7,760,157 B2    7/2010 Cowan et al.
  (Continued)

FOREIGN PATENT DOCUMENTS

FR    3000232    5/2013

*Primary Examiner* — Bao-Luan Le

(74) *Attorney, Agent, or Firm* — Occhiuti & Rohlicek LLP

(57) ABSTRACT

A time-multiplexed stereoscopic 3*d* projection system including a beam-splitting element to split the randomly polarized image-beam generated by a single-lens projector into one primary image-beam, possessing a first state of linear polarization, and two secondary image-beams, both possessing a second state of linear polarization. The polarization states are mutually orthogonal. The primary and secondary image-beams recombine to form a complete image on the surface of a polarization-preserving projection-screen. There are polarization modulators that modulate the first and second states of linear polarization between a left and right circular polarization state. There is a contrast enhancement film in the optical-path of the primary or secondary image-beams located between the polarization modulator and the projection-screen. The contrast enhancement film comprises a stack of at least three uniaxially stretched retardation-films which perturb the circular polarization state of said image-beams and which possess an in-plane retardation value substantially equal to 140 nm, 270 nm, or 540 nm.

26 Claims, 4 Drawing Sheets

(56) References Cited

U.S. PATENT DOCUMENTS

| | | | |
|---|---|---|---|
| 8,220,934 B2 | 7/2012 | Schuck et al. | |
| 8,305,502 B2 * | 11/2012 | Silverstein | G02B 27/1053 349/106 |
| 8,425,041 B2 * | 4/2013 | Schuck | G03B 35/26 349/5 |
| 8,508,676 B2 * | 8/2013 | Silverstein | G02B 27/1053 349/8 |
| 8,602,563 B2 * | 12/2013 | Nishikawa | G02B 26/0816 348/757 |
| 8,757,806 B2 * | 6/2014 | Schuck | G03B 35/26 348/744 |
| 2006/0291053 A1 | 12/2006 | Robinson et al. | |
| 2007/0024792 A1 * | 2/2007 | Chang | G02F 1/13363 349/141 |
| 2010/0141856 A1 * | 6/2010 | Schuck | G03B 35/26 349/9 |
| 2010/0182571 A1 * | 7/2010 | Nishikawa | G02B 26/0816 353/20 |
| 2011/0109820 A1 * | 5/2011 | Silverstein | G02B 27/1053 349/8 |
| 2012/0188469 A1 * | 7/2012 | Fukui | G03B 21/2013 349/5 |
| 2012/0307362 A1 * | 12/2012 | Silverstein | G02B 27/1053 359/485.04 |
| 2013/0235284 A1 * | 9/2013 | Schuck | G03B 35/26 349/8 |
| 2014/0104580 A1 * | 4/2014 | Tsai | G03B 21/28 353/30 |
| 2015/0103318 A1 * | 4/2015 | Lee | G02B 27/2264 353/8 |
| 2015/0109539 A1 * | 4/2015 | Li | G02B 27/26 349/9 |
| 2016/0054500 A1 * | 2/2016 | Koike | G02F 1/13363 353/20 |

\* cited by examiner

FIGURE 1 (PRIOR-ART)

FIGURE 2 (PRIOR-ART)

STEREOSCOPIC 3D PROJECTION SYSTEM WITH IMPROVED LEVEL OF OPTICAL LIGHT EFFICIENCY

FIELD OF INVENTION

The present invention relates to a stereoscopic 3d projection system offering an improved level of optical light efficiency and designed to provide time-multiplexed stereoscopic 3d images using a single-lens projector together with a polarization beam-splitter, polarization modulator, silver-screen and passive circular-polarized viewing-goggles.

BACKGROUND

Stereoscopic 3d projection systems have been used for many years. One technology known to the art and described for example in US patent no. 2006/0291053A1 dated 28 Dec. 2006 and entitled "Achromatic Polarization Switches", describes how a polarization modulator can be placed in-front of a single-lens projector such as a 3-chip DLP digital cinema projector.

The projector is arranged so as to generate a single-beam comprising a succession of alternate left and right-eye images at high speeds of typically 144 Hz. The polarization modulator then imparts an optical polarization state to images generated by said projector and said polarization modulator is operated in synchronization with said projector in order to ensure all left-eye images possess a first state of circular polarization and all right-eye images possess a second state of circular polarization, with said first and second states of circular polarization being mutually orthogonal (i.e possessing opposite senses of circular rotation).

Thereafter, said left and right-eye images are focused onto the surface of a polarization-preserving projection-screen such as a silver-screen or otherwise, thereby enabling the viewing of time-multiplexed stereoscopic 3d images via utilization of passive circular-polarized viewing-goggles.

Moreover, it will be known to one skilled in the art that said polarization modulator may comprise of at least one or more liquid crystal elements stacked together in order to achieve the required electro-optical switching characteristics. One technology known to the art and described for example in U.S. Pat. No. 7,760,157 B2 dated 20 Jul. 2010 and entitled "Enhanced ZScreen modulator techniques", describes how said polarization modulator may comprise of two individual liquid crystal pi-cells stacked together in mutually crossed orientation. Pi-cell liquid crystal elements are known to the art and characterized by their surface alignment-directors on each substrate being mutually parallel and aligned in the same direction. Therefore, in at least one optical state the liquid crystal material in said pi-cell forms a helical structure between said substrates with an overall twist of 180 degrees (i.e pi or π radians). A detailed description of the design and function of pi-cells can be found elsewhere in the literature according to the prior-art.

In this case, each pi-cell can for example be rapidly switched between a first optical state possessing predominantly zero optical retardation when driven with high voltage (eg. 25 volt) in order to switch the liquid crystal material to the homeotropic texture, and a second optical state possessing an optical retardation close to 140 nm (nanometers) when driven with a low voltage (eg. 3 volt) in order to switch the liquid crystal material to the splay texture with predominantly zero degree twist. Moreover, said pi-cells are capable of being rapidly switched between said first and second optical states at speeds of greater than typically 350 µs (microseconds) and are therefore often used when designing such polarization modulator products according to the state of the art.

Furthermore, it will be known to one skilled in the art that when said pi-cell is in an optical state that possesses a retardation value close to 140 nm, then said pi-cell constitutes an optical Quarter-Wave-Plate (QWP) for the central part of the visible wavelength region and will therefore convert linearly polarized visible light directly to circular polarization.

Therefore, by stacking together two individual pi-cells in mutually crossed orientation together with a linear polarization-filter located at the input surface of said stack in order to convert the initially randomly polarized (i.e unpolarized) incident light generated by a projector to linear polarization, the images generated by said projector can be rapidly modulated between left and right circular polarization states by driving said pi-cells mutually out-of-phase such that when said first pi-cell is operated with high voltage (i.e liquid crystal material is switched to the homeotropic texture) then said second pi-cell is simultaneously operated with low voltage (i.e liquid crystal material is switched to the splay texture), and vice versa.

Moreover, it is known to one skilled in the art that the two lenses present in passive circular-polarized viewing-goggles typically each comprise of a linear polarization-filter laminated together with a single uniaxially stretched optical retardation-film. Furthermore, said retardation-film typically possesses an in-plane optical retardation value of substantially 140 nm in order to constitute a Quarter-Wave-Plate (QWP) for the central part of the visible wavelength region. This ensures light that is initially circularly polarized will first be converted to linear polarization by said retardation-film (QWP), before being either transmitted or blocked thereafter by said polarization-filter depending upon the orientation of said linear polarization state.

Moreover, it will be known to one skilled in the art that the linear polarization-filters present in both lenses of common passive circular-polarized viewing-goggles are typically both oriented with their transmission axes aligned horizontally. Furthermore, for the left-eye lens the optical-axis of said retardation-film (QWP) is typically aligned at −45 degrees (minus) in a clockwise direction relative to the horizontal, whereas for the right-eye lens the optical-axis of said retardation-film (QWP) is typically aligned at +45 degrees (plus) relative to the horizontal, respectively.

This ensures light that is initially left circularly polarized (i.e with anti-clockwise sense of rotation) will be transmitted by the right-eye lens whilst simultaneously being blocked by the left-eye lens, whereas light that is initially right circularly polarized (i.e with clockwise sense of rotation) will instead be blocked by the right-eye lens whilst simultaneously being transmitted by the left-eye lens, respectively.

Furthermore, it will be known to one skilled in the art that when the retardation-film (140 nm) present in one of the lenses of said viewing-goggles is mutually crossed with the retardation (140 nm) present in one of said pi-cells being operated with low voltage (i.e when the liquid crystal material is switched to the splay texture), then a high level of optical compensation will occur for all visible wavelengths.

Furthermore, if in addition the linear polarization-filter located at the input surface of said polarization modulator is aligned perpendicularly (i.e with its transmission axis being vertical) relative to the linear polarization-filter present in the lens of said viewing-goggles, then a high level of optical blocking will be achieved for all visible wavelengths, thereby providing for a low level of ghosting or crosstalk when viewing stereoscopic 3d images; this is therefore a preferred arrangement according to the prior-art technology.

Furthermore, when the retardation-film (140 nm) present in one of the lenses of said viewing-goggles is instead mutually parallel with the retardation (140 nm) present in one of said pi-cells being operated with low voltage, then the overall combined retardation will then summate to 140 nm (pi-cell)+140 nm (viewing-goggles)=280 nm, and the system thus constitutes a chromatic Half-Wave-Plate (HWP) for the central part of the visible wavelength region (i.e green wavelengths).

In this case, linearly polarized visible light passing through the system will now be rotated by approximately 90 degrees due to said chromatic Half-Wave-Plate. Additionally, should the linear polarization-filter located at the input surface of said polarization modulator also be aligned perpendicularly (i.e with its transmission axis being vertical) relative to the linear polarization-filter present in one of the lenses of said viewing-goggles, then said lens will transmit the light with high efficiency; this is therefore also a preferred arrangement according to the prior-art.

However, if instead the linear polarization-filter located at the input surface of said polarization modulator is parallel (i.e with its transmission axis being horizontal) relative to said linear polarization-filter present in the lens of said viewing-goggles, then when the retardation present in one of said pi-cells and one of the lenses in said viewing-goggles summate to form a chromatic Half-Wave-Plate, then a high level of ghosting or crosstalk will occur when viewing stereoscopic 3d images since in this case said chromatic Half-Wave-Plate is unable to fully rotate all visible wavelengths by exactly 90 degrees.

It is therefore desirable to avoid utilizing this specific disadvantageous arrangement and instead ensure that when stacking together two pi-cells in mutually crossed orientation in order to design a polarization modulator according to the state of the art, then the linear polarization-filter located at the input surface of said polarization modulator is preferably aligned perpendicularly relative to the linear polarization-filter present in both lenses of said circular polarized viewing-goggles.

Furthermore, since the transmission axes of the linear polarization-filters present in said lenses of common passive circular-polarized viewing-goggles are typically both aligned horizontally, then it will be known to one skilled in the art that one preferred arrangement according to the state of the art is that the transmission axis of the linear polarization-filter located at the input surface of said polarization modulator should be aligned vertically in order to ensure a low level of ghosting or crosstalk is obtained when viewing time-multiplexed stereoscopic 3d images.

The majority of polarization modulator products currently on the market therefore utilize two pi-cell liquid crystal elements stacked together in mutually crossed orientation together with a linear polarization-filter located at the input surface of said polarization modulator and with the transmission axis of said linear polarization-filter being aligned vertically.

However, one problem of the aforementioned single-beam system according to the state of the art is that since images generated by typical 3-chip DLP digital cinema projectors are initially randomly polarized, then the linear polarization-filter located at the input surface of said polarization modulator will absorb approximately 50% of the incoming light generated by said projector. This will therefore significantly reduce the overall optical light efficiency of the system, thereby resulting in the creation of stereoscopic 3d images that are severely lacking in on-screen image brightness.

One technology known to the art for increasing the overall optical light efficiency of a stereoscopic 3d projection system and described for example in U.S. Pat. No. 8,220,934 B2 dated 17 Jul. 2012 and entitled "Polarization conversion systems for stereoscopic projection", uses a polarization beam-splitting element in order to split the incoming randomly polarized incident image-beam generated by a single-lens projector into one primary image-beam propagating in the same direction as said original incident image-beam and possessing a first state of linear polarization, and one secondary image-beam propagating in a perpendicular direction relative to said incident image-beam and possessing a second state of linear polarization, with said first and second states of linear polarization being mutually orthogonal.

Thereafter, a mirror is used to reflect said secondary image-beam towards the surface of a projection-screen and both primary and secondary image-beams are thereby arranged so as to mutually overlap to a substantial extent on the surface of said projection-screen. Such double-beam systems therefore enable both polarization components comprising the initial incident image-beam to be used in order to generate the overall on-screen image, thereby increasing the resulting image brightness.

Furthermore, polarization modulators are then placed within the optical-paths of both primary and secondary image-beams and designed so as to modulate the polarization states of said image-beams. In one preferred embodiment of the aforementioned double-beam system according to the state of the art, said polarization modulators each comprise of two separate pi-cell liquid crystal elements stacked together in mutually crossed orientation and designed to rapidly modulate the linear polarization states of said primary and secondary image-beams between a left and right circular polarization state in synchronization with the images generated by said projector.

However, in order to obtain a low level of ghosting or crosstalk when utilizing pi-cells of the type described herein, it is stipulated in the aforementioned U.S. Pat. No. 8,220,934 B2 that the linear polarization state of said primary and secondary image-beams at the input surfaces of each polarization modulator must both be aligned perpendicularly (i.e input polarization is required to be vertical) relative to the linear polarization-filters present in both lenses of said passive circular-polarized viewing-goggles.

However, since said primary and secondary image-beams possess mutually orthogonal linear polarization states, it is described in the aforementioned U.S. Pat. No. 8,220,934 B2 that this criterion can only be achieved by using a polarization rotator placed within the optical-path of the secondary image-beam and designed so as to rotate by 90 degrees the linear polarization state of said secondary image-beam so that it is transformed into the same linear polarization state as that of the primary image-beam; i.e the polarization rotator ensures that both primary and secondary image-beams thereafter possess a vertical linear state of polarization which is perpendicular to the transmission axis of the linear polarization-filters present in both lenses of said passive circular-polarized viewing-goggles.

In order for this criterion to be fulfilled, it will be understood by one skilled in the art that the polarization rotator must be placed within the optical-path of the secondary image-beam and be located somewhere between the beam-splitting element and input surface of said polarization modulator, but may be positioned either before or after the reflecting mirror. Moreover, in the case said polarization rotator comprises of several individual elements stacked together, some elements may for example be positioned before said mirror with other elements being positioned after said mirror, respectively.

Whilst the use of a polarization rotator to rotate by 90 degrees the linear polarization state of the secondary image-beam ensures the system possesses a low level of ghosting or crosstalk when viewing stereoscopic 3d images according to the state of the art, the optical efficiency of said polarization rotator is typically less than approximately 90% over the visible wavelength range, thereby resulting in a loss of optical light efficiency and a reduction in the overall on-screen image brightness.

The double-beam system described above in the aforementioned U.S. Pat. No. 8,220,934 B2 according to the state of the art also has the disadvantage in that there is a relatively large optical-path-length difference between said primary and secondary image-beams, thereby typically requiring the use of a telephoto-lens pair and/or the deformation of the reflecting-mirror in order to compensate for said optical-path-length difference. However this will add both complexity and expense to the overall system.

An improved multiple-beam system for displaying high brightness stereoscopic 3d images disclosed in French patent no. FR3000232A1 dated 29 May 2013 and entitled "Dispositif de polarisation optique pour un projecteur d'images stereoscopiques" and incorporated by way of reference herein, uses a beam-splitting element that separates the randomly polarized incident image-beam generated by a single-lens projector into one primary image-beam propagating in the same direction as said original incident image-beam and possessing a first state of linear polarization, and two secondary image-beams propagating in mutually opposite directions which are both perpendicular to said incident image-beam and both possessing a second state of linear polarization, with said first and second states of linear polarization being mutually orthogonal.

Thereafter, reflecting surfaces such as mirrors or otherwise are used to direct both secondary image-beams towards a polarization-preserving projection-screen and arranged such that said primary and secondary image-beams partially overlap in order to mutually recombine to form a complete image on the surface of said projection-screen. Such triple-beam systems therefore enable both polarization components comprising the original incident image-beam to be used to recreate the overall on-screen image, thereby ensuring for a high level of image brightness.

Furthermore, polarization modulators are then placed within the optical-paths of each of said primary and secondary image-beams and operated so as to modulate the polarization states of said image-beams in synchronization with the images generated by said projector.

In one preferred embodiment of the aforementioned triple-beam system, said polarization modulators may each comprise of two individual pi-cell liquid crystal elements stacked together in mutually crossed orientation and operated so as to convert the linear polarization states of said primary and secondary image-beams to circular polarization.

Furthermore, since the linear polarization states of said primary and secondary image-beams are mutually orthogonal, it will be understood by one skilled in the art that the linear polarization state of at least one of said primary and secondary image-beams will be parallel with the transmission axis of the linear polarization-filters present in the lenses of said passive circular-polarized viewing-goggles and in this disadvantageous configuration according to the state of the art there will normally be an undesirably high level of ghosting or crosstalk when viewing time-multiplexed stereoscopic 3d images.

Moreover, in order to mitigate this problem it is known to one skilled in the art that a polarization rotator placed within the optical-paths of said secondary image-beams and located somewhere between the beam-splitter and input surface of said polarization modulators can be used in order to rotate by 90 degrees the linear polarization state of said secondary image-beams so that said linear polarization state is transformed into the same linear polarization state of said primary image-beam. However, since the optical efficiency of said polarization rotator is typically less than approximately 90% over the visible wavelength region, this will generate an unwanted loss of optical light efficiency and reduce the overall on-screen image brightness.

It will also be understood by one skilled in the art that the aforementioned triple-beam system will possess a relatively small optical-path-length difference between said primary and secondary image-beams as compared to the previously described double-beam system according to the state of the art, thereby eliminating the necessity of utilizing a telephoto-lens pair in order to compensate for said optical-path-length difference, hence reducing the overall complexity and cost of the system.

SUMMARY OF INVENTION

An object of the present invention is to provide a method to reduce the level of ghosting or crosstalk when viewing time-multiplexed stereoscopic 3d images using a multiple-beam system comprising of two or more separate image-beams without the necessity of utilizing a polarization rotator placed within the optical-path of at least one of said primary and secondary image-beams and which would otherwise reduce the overall on-screen image brightness.

A further object of the present invention is to provide a triple-beam stereoscopic 3d projection system comprising a polarization modulator for each of said primary and secondary image-beams, with said polarization modulators each further comprising a stack of two individual pi-cells oriented in mutually crossed orientation and which generates a low level of ghosting or crosstalk whilst maintaining a higher level of optical efficiency as compared to other prior-art technologies.

The invention is based on the insight that when the linear polarization state of an image-beam at the input surface of a polarization modulator comprising a stack of two individual pi-cells is parallel with the linear polarization-filter present in at least one of the lenses of said passive circular-polarized viewing-goggles, then a high level of optical blocking can still be achieved for one of said lenses by incorporating a suitable contrast enhancement film comprising a stack of three or more uniaxially stretched in-plane retardation-films located at the exit surface of said polarization modulator and designed so as to perturb and improve the level of circular polarization of the image-beam exiting said polarization modulator without changing the overall circular polarization state of said image-beam in order to increase the amount of optical blocking achieved by said lens, thereby reducing the level of ghosting or crosstalk whilst maintaining the overall optical light efficiency at a high level.

In one aspect of the invention, a time-multiplexed stereoscopic 3d projection system is disclosed for projecting a randomly polarized incident image-beam generated by a single-lens projector onto a polarization-preserving projection-screen. The system includes a beam-splitting element operable to split the randomly polarized incident image-beam generated by the single-lens projector into one primary image-beam, having a primary image-beam path, possessing a first state of linear polarization and two secondary image-beams, each having respective secondary image-beam paths, both possessing a second state of linear polarization. The first and second states of linear polarization being mutually orthogonal. The secondary image-beam paths for said secondary image-beams both being diverted by reflecting-surfaces such that the primary and secondary image-beams partially overlap and mutually recombine to form a complete image on the surface of said polarization-preserving projection-screen. There is a polarization modulator disposed in each of the primary image-beam path and the two secondary image-beam paths, configured to modulate the first and second states of linear polarization between a left and right circular polarization state in synchronization with images generated by the projector. There is also a contrast enhancement film disposed within the optical-path of at least one of said primary and secondary image-beams and positioned between the associated polarization modulator and the projection-screen. The contrast enhancement film comprises a stack of at least three separate uniaxially stretched retardation-films configured to perturb the circular polarization state of the at least one of said primary and secondary image-beams, which each individually possess an in-plane retardation value being substantially equal to one of 140 nm, 270 nm, or 540 nm.

In other aspects of the invention, each uniaxially stretched retardation-film has an optical axis aligned at a specified angle and at least two of the uniaxially stretched retardation-films have optical axes aligned at different angles. The polarization modulators have an exit surface through which the primary and secondary image-beams respectively pass and where the contrast enhancement film is located in proximity to the exit surface of its associated polarization modulator. The contrast enhancement film is bonded to the exit surface of its associated polarization modulator and is located in proximity to the polarization modulator in the primary image-beam path. The linear polarization state of the primary image-beam is configured to be parallel with the transmission axis of the linear polarization filter present in said passive circular-polarized viewing-goggles. The contrast enhancement films are located at the exit surfaces of each of the polarization modulators and are bonded to the exit surfaces of their associated polarization modulator. The uniaxially stretched retardation-films composing the contrast enhancement film are bonded together using an optical adhesive. The polarization modulators each comprise a stack of two individual pi-cell liquid crystal elements placed together in series and the two individual pi-cell liquid crystal elements are arranged to be in mutually crossed orientation and are switched between a first optical processing state and a second optical processing state. The first optical processing state and the second optical processing state cause the primary image-beam and the two secondary image-beams to be modulated between a left and a right circular polarization state, respectively.

In yet other aspects of the invention, a contrast enhancement film for placement within the optical-path of an image-beam exiting a polarization modulator is disclosed. The contrast enhancement film is configured to perturb the circular polarization state of the image beam. The contrast enhancement film comprises a stack of at least three separate uniaxially stretched retardation-films, wherein the uniaxially stretched retardation-films each individually possess an in-plane retardation value being substantially equal to one of 140 nm, 270 nm, or 540 nm. Each uniaxially stretched retardation-film has an optical axis aligned at a specified angle, wherein at least two of the uniaxially stretched retardation-films have optical axes aligned at different angles. The uniaxially stretched retardation-films composing the contrast enhancement film are bonded together using an optical adhesive.

In further aspects, a time-multiplexed stereoscopic 3d projection method is disclosed for projecting a randomly polarized incident image-beam generated by a single-lens projector onto a polarization-preserving projection-screen. The method includes splitting, using a beam-splitting element, the randomly polarized incident image-beam generated by the single-lens projector into one primary image-beam, having a primary image-beam path, possessing a first state of linear polarization and two secondary image-beams, each having respective secondary image-beam paths, both possessing a second state of linear polarization. The first and second states of linear polarization being mutually orthogonal and said secondary image-beam paths for said secondary image-beams both being diverted by reflecting-surfaces such that said primary and secondary image-beams partially overlap and mutually recombine to form a complete image on the surface of said polarization-preserving projection-screen. The method includes modulating, using a polarization modulator disposed in each of the primary image-beam path and the two secondary image-beam paths, the first and second states of linear polarization between a left and right circular polarization state in synchronization with images generated by the projector. It also includes disposing a contrast enhancement film within the optical-path of at least one of said primary and secondary image-beams positioned between the associated polarization modulator and the projection-screen. The contrast enhancement film comprises a stack of at least three separate uniaxially stretched retardation-films configured to perturb the circular polarization state of the at least one of the primary and secondary image-beams. The uniaxially stretched retardation-films each individually possess an in-plane retardation value being substantially equal to one of 140 nm, 270 nm, or 540 nm.

In certain aspects, there is disclosed a method including aligning the optical axes of each of the uniaxially stretched retardation-films at a specified angle. At least two of the uniaxially stretched retardation-films have optical axes aligned at different angles. The method includes disposing a contrast enhancement film on the exit surface of the polarization modulator. The method further includes bonding the contrast enhancement film to the exit surface of the polarization modulator. There is also disclosed a contrast enhancement film located in proximity to the polarization modulator in the primary image-beam path with the linear polarization state of the primary image-beam being configured to be parallel with the transmission axis of the linear polarization filter present in the passive circular-polarized viewing-goggles. The method further includes disposing contrast enhancement films at the exit surfaces of each of said polarization modulators and bonding said contrast enhancement films to the exit surfaces of their associated polarization modulators. The step of bonding involves using an optical adhesive. The polarization modulators each comprise a stack of two individual pi-cell liquid crystal elements placed together in series and the two individual pi-cell liquid crystal elements are arranged to be in mutually crossed orientation and are switched between a first optical processing state and a second optical processing state. The first optical processing state and the second optical processing state cause the primary image-beam and the two secondary image-beams to be modulated between a left and a right circular polarization state, respectively.

The method of the invention additionally includes perturbing the circular polarization state of an image-beam having an optical-path exiting a polarization modulator. The method involves placing a contrast enhancement film having at least three separate uniaxially stretched retardation-films within the optical-path of the image-beam exiting a polarization modulator. The uniaxially stretched retardation-films each individually possess an in-plane retardation value being substantially equal to one of 140 nm, 270 nm, or 540 nm. The optical axes for each of the uniaxially stretched retardation-films are aligned at specified angles and at least two of said uniaxially stretched retardation-films have optical axes aligned at different angles. The method further includes bonding together, using an optical adhesive, the at least three uniaxially stretched retardation-films composing the contrast enhancement film.

BRIEF DESCRIPTION OF THE DRAWINGS

The present invention may be better understood and its objects and advantages will become apparent to one skilled in the art by reference to the accompanying drawings, wherein like reference numerals refer to like elements in several of the figures.

DETAILED DESCRIPTION

Figure 1:
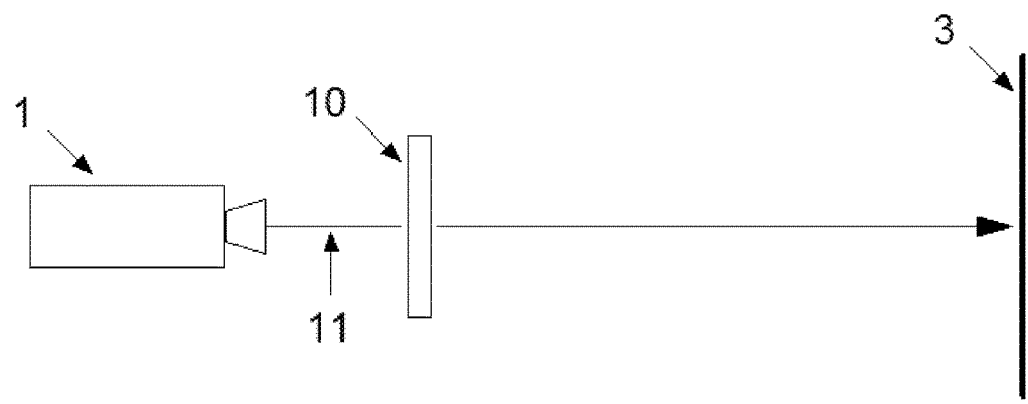
FIG. 1 shows a stereoscopic 3d projection system comprising a single-beam arrangement according to the state of the art.

FIG. 1 shows a single-beam stereoscopic 3d projection system according to the state of the art where a polarization modulator 10 comprising a stack of one or more liquid crystal elements (not shown) is placed directly in front of the lens of a projector 1, such as a 3-chip DLP digital cinema projector or otherwise.

In this figure and all underlying figures thereafter, the paths of image-beams are represented by single-line vectors for ease of clarity. However, it will be understood by one skilled in the art that said image-beams typically possess some level of angular divergence, for example ±10 degrees in the vertical plane and ±22 degrees in the horizontal plane, respectively. However, it is to be understood that the occurrence of said beam divergence does not depart from the inventive ideas disclosed herein and will therefore be omitted in the underlying drawings for ease of clarity.

The projector 1 generates a succession of alternate left and right-eye images 11 at high frequencies of typically 144 Hz and said polarization modulator 10 is arranged so as to impart a first circular polarization state to all left-eye images and a second circular polarization state to all right-eye images respectively, with said first and second circular polarization states being mutually orthogonal.

Thereafter, said left and right-eye images are focused onto the surface of a polarization-preserving projection-screen 3 such as a silver-screen or otherwise and time-multiplexed stereoscopic 3d imagery can then be viewed via utilization of passive circular-polarized viewing-goggles (not shown).

However, since typical cinema projectors currently on the market such as 3-chip DLP projectors generate images that are initially randomly polarized, it will be known to one skilled in the art that a linear polarization-filter (not shown) is required to be located at the input surface of said polarization modulator 10.

Moreover, a preferred embodiment according to the state of the art is that said polarization modulator 10 comprises of two individual liquid crystal pi-cells (not shown) stacked together in mutually crossed orientation. Pi-cells are characterized by their surface alignment-directors on each substrate being aligned mutually parallel and oriented in the same direction, thereby in at least one optical state the liquid crystal material forms a helical structure between said substrates possessing a 180 degree twist of rotation (i.e pi radians).

Furthermore, said pi-cell can for example be switched between a first optical state possessing zero retardation when driven with high voltage (eg. 25 volt) in order to switch the liquid crystal material to the homeotropic texture, and a second optical state possessing an optical retardation close to 140 nm when driven with low voltage (eg. 3 volt) in order to switch the liquid crystal material to the splay texture with zero twist. Moreover, when said pi-cell is in said second optical state possessing a retardation value close to 140 nm, then said pi-cell constitutes a Quarter-Wave-Plate (QWP) for the central part of the visible wavelength region and will therefore convert linearly polarized light directly to circular polarization.

Moreover, it will be known to one skilled in the art that said pi-cells can preferably be operated mutually out-of-phase, wherein during the period when said first pi-cell is operated with high voltage (eg. 25 volt) then said second pi-cell is simultaneously operated with low voltage (eg. 3 volt) and vice versa. This enables the incident light-beam 11 to be rapidly modulated between left and right circular polarization states.

It is also known to one skilled in the art that the lenses of passive circular-polarized viewing-goggles typically each comprise of a linear polarization-filter laminated together with a retardation-film. Furthermore, said retardation-film typically comprises a single uniaxially stretched retardation-film with an in-plane retardation value close to 140 nm.

Furthermore, should the linear polarization-filter located at the input surface of said polarization modulator 10 be aligned parallel relative to the linear polarization-filter present in the lenses of said passive circular-polarized viewing-goggles, then when the retardation (140 nm) present in one of said pi-cells operated with low voltage is parallel with the retardation-film (140 nm) present in one of said lenses, then the overall retardation will summate to 140 nm (pi-cell)+140 nm (viewing-goggles)=280 nm and the system will thus constitute a chromatic Half-Wave-Plate (HWP) for the central part of the visible spectrum. In such case, since said chromatic Half-Wave-Plate is unable to rotate all visible wavelengths by exactly 90 degrees, then said lens will be unable to fully block all visible wavelengths and an undesirably high level of ghosting or crosstalk will therefore be observed when viewing time-multiplexed stereoscopic 3d images.

For this reason, it is known to one skilled in the art that the majority of polarization modulator products currently on the market comprise of two pi-cells stacked together in mutually crossed orientation and with the transmission axis of said linear polarization-filter located at the input surface of said polarization modulator being aligned perpendicularly relative to the linear polarization-filters present in both lenses of said passive circular-polarized viewing-goggles.

Furthermore, since the linear polarization-filters present in both lenses of said viewing-goggles are typically aligned with their transmission axes being horizontal, then it will be known to one skilled in the art that a preferred arrangement occurs when the linear polarization-filter located at the input surface of said polarization modulator is aligned with its transmission axis being vertical.

Figure 2:
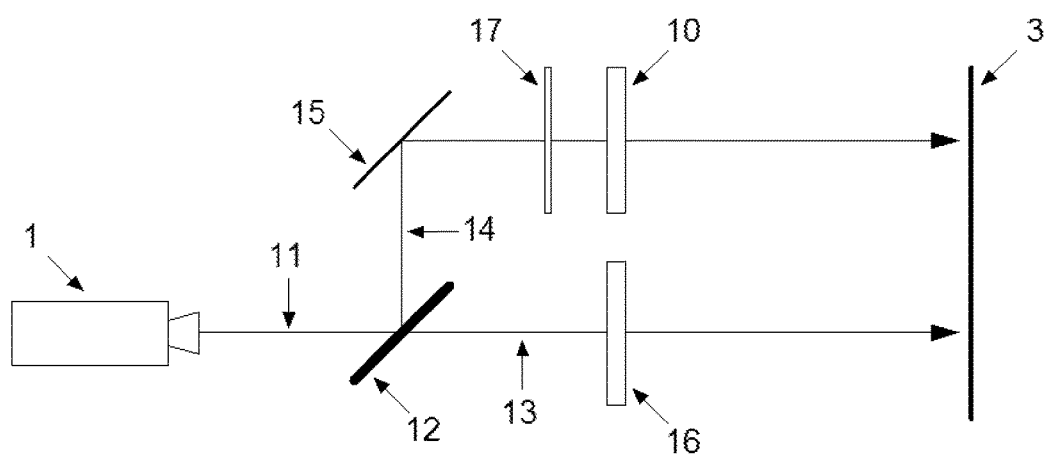
FIG. 2 shows a stereoscopic 3d projection system comprising a double-beam arrangement according to the state of the art.

However, although the single-beam stereoscopic 3d system described in FIG. 1 provides for a low level of ghosting or crosstalk, it will be known to one skilled in the art that the linear polarization-filter located at the input surface of said polarization modulator 10 will absorb approximately 50% of the incident randomly polarized light generated by said projector 1, thereby resulting in the generation of time-multiplexed stereoscopic 3d images that are severely lacking in on-screen image brightness. FIG. 2 shows an alternative stereoscopic 3d projection system comprising a double-beam arrangement according to the state of the art and which provides for a higher level of on-screen image brightness as compared to the aforementioned single-beam system.

Here, a beam-splitting element 12 placed in front of the lens of said projector 1 splits the in-coming incident image-beam 11 into one primary image-beam 13 propagating in the same direction as said original incident image-beam 11 and possessing a first state of linear polarization, and one secondary image-beam 14 propagating in a direction perpendicular to said incident image-beam 11 and possessing a second state of linear polarization, with said first and second states of linear polarization being mutually orthogonal.

A deformable mirror 15 is used to reflect said secondary image-beam 14 towards a polarization-preserving projection-screen 3 and arranged such that said primary and secondary image-beams mutually overlap to a substantial extent on the surface of said projection-screen 3 in order to recreate a complete image. In this arrangement according to the state of the art, both polarization components comprising the original incident image-beam 11 are thereby utilized to generate the overall on-screen image, hence providing for a higher level of image brightness.

Polarization modulators 16, 10 are then used to modulate the optical polarization states of said primary and secondary image-beams 13, 14 respectively and arranged such that alternate left and right-eye images generated by said projector 1 each possess one of a left and right circular polarization state respectively, thereby enabling time-multiplexed stereoscopic 3d images to be viewed via utilization of passive circular-polarized viewing-goggles (not shown).

Furthermore, the beam-splitting element 12 may preferably comprise a Wire-Grid Polarizer or otherwise and additionally there may or may not be a telephoto-lens pair (not shown) located within the optical-path of the primary image-beam 13 in order to compensate for the relatively large difference in optical-path-lengths between said primary and secondary image-beams 13, 14 thereto.

In one preferred embodiment of the aforementioned double-beam stereoscopic 3d system according to the state of the art, said polarization modulators 10, 16 each comprise of two individual pi-cell liquid crystal elements (not shown) stacked together in mutually crossed orientation. Furthermore, each pi-cell can for example be switched between a first optical state possessing zero retardation when driven with high voltage (eg. 25 volt), and a second optical state possessing a retardation value of substantially 140 nm when driven with low voltage (eg. 3 volt), respectively.

Moreover, when one of said pi-cells is driven with low voltage (eg. 3 volt) so that it possesses a retardation value close to 140 nm, then said pi-cell constitutes a Quarter-Wave-Plate (QWP) for the central part of the visible spectrum and will therefore convert linearly polarized visible light directly to circular polarization.

It will therefore be known to one skilled in the art that if said pi-cells are operated mutually out-of-phase such that when said first pi-cell is operated with high voltage then said second pi-cell is simultaneously operated with low voltage and vice versa, then said polarization modulator is able to rapidly modulate a linear polarized image-beam between a left and right circular polarization state.

Moreover, it is known to one skilled in the art that the two lenses present in typical passive circular-polarized viewing-goggles each comprise a linear polarization-filter laminated together with a retardation-film. Furthermore, said retardation-film typically comprises a single uniaxially stretched retardation-film possessing an in-plane retardation value close to 140 nm.

Moreover, when the retardation present in one of said pi-cells being operated with low voltage (eg. 3 volt) is aligned parallel with said retardation-film present in one of said lenses, then the overall retardation will summate to 140 nm (pi-cell)+140 nm (viewing-goggles)=280 nm and in such case the system will thus constitute a chromatic Half-Wave-Plate (HWP) for the central part of the visible wavelength region.

Additionally, if the linear polarization-filter located at the input surface of said polarization modulator is aligned parallel relative to the linear polarization-filter present in both lenses of said viewing-goggles, then said lens will be unable to effectively block all visible wavelengths since the resulting chromatic Half-Wave-Plate is not capable of rotating all visible wavelengths by exactly 90 degrees. This will therefore result in the generation of a relatively high level of ghosting or crosstalk when viewing time-multiplexed stereoscopic 3d images.

Therefore, since the transmission axes of the linear polarization-filters present in both lenses of said viewing-goggles are typically both aligned horizontally, a preferred embodiment according to the state of the art is to ensure the linear polarization-filters located at the input surfaces for each of said polarization modulators 10, 16 are both aligned with their transmission axes being vertical in order to ensure a low level of ghosting or crosstalk is achieved when using typical passive circular-polarized viewing-goggles.

However, since the linear polarization states of said primary and secondary image-beams 13, 14 are mutually orthogonal, this criterion can only be achieved by placing a polarization rotator 17 within the optical-path of said secondary image-beam 14 and designed so as to rotate by 90 degrees the linear polarization state of said secondary image-beam 14 so that said linear polarization state is then transformed into the same linear polarization state as said primary image-beam 13 thereof.

Accordingly, said polarization rotator 17 must be placed within the optical-path of said secondary image-beam 14 and be located somewhere between said beam-splitting element 12 and the input surface of said polarization modulator 10, but may otherwise be positioned either before or after said reflecting surface 15 in order to ensure the linear polarization states for both primary and secondary image-beams 13, 14 are aligned vertically at the input surfaces of said polarization modulators 16, 10 respectively. This thereby ensures a low level of ghosting or crosstalk is achieved according to the state of the art.

However, since the optical efficiency of said polarization rotator 17 is typically only approximately 90% over the visible wavelength region, the incorporation of said polarization rotator 17 will result in the reduction of the overall optical light efficiency of the system, hence reducing the resulting on-screen image brightness.

Additionally, since there is a relatively large difference in optical-path-lengths between said primary and secondary image-beams 13, 14 thereto, it will be known to one skilled in the art that a telephoto-lens pair (not shown) is typically required to be located within the optical-path of the primary image-beam 13 in order to compensate for said optical-path-length difference. However, this will further reduce the overall on-screen image brightness and increase the complexity and cost of the system.

Figure 3:
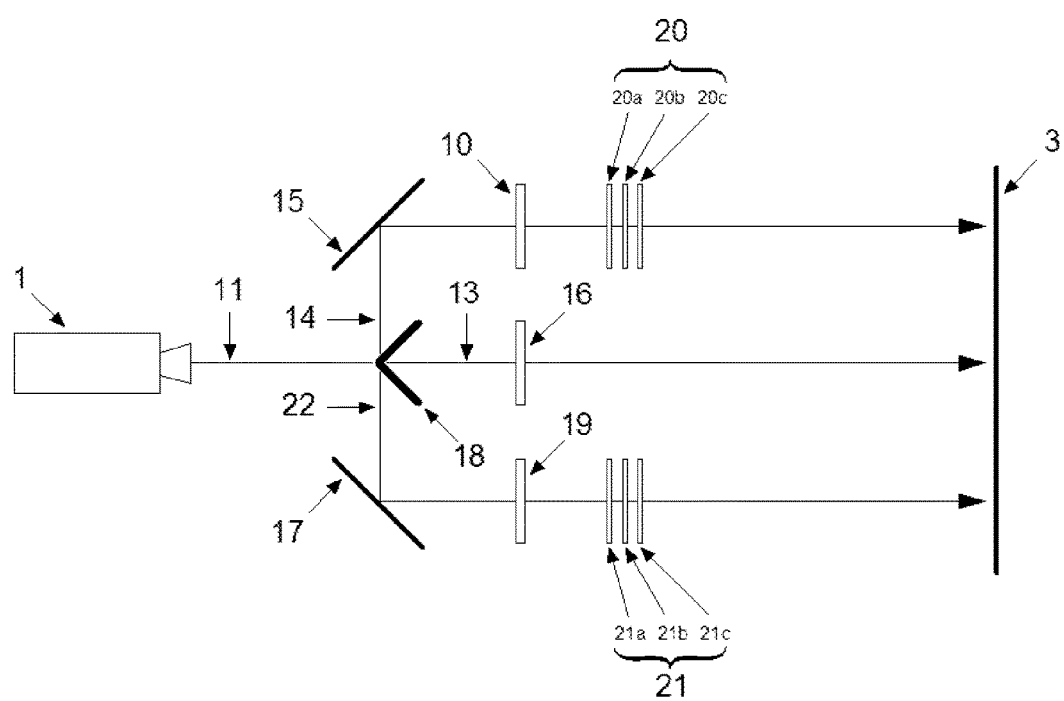
FIG. 3 shows a stereoscopic 3d projection system comprising a triple-beam arrangement according to a preferred embodiment of the present invention.

FIG. 3 shows a preferred embodiment of the present invention that mitigates the shortcomings of the aforementioned prior-art technologies as described herein. Here, a triple-beam stereoscopic 3d projection system is disclosed comprising a beam-splitting element 18 that separates the incoming image-beam 11 into one primary image-beam 13 propagating in the same direction as said original incident image-beam 11 and possessing a first state of linear polarization, and two secondary image-beams 14, 22 propagating in mutually opposite directions which are also both perpendicular to said incident image-beam 11 and both possessing a second state of linear polarization, with said first and second linear polarization states being mutually orthogonal.

Thereafter, reflecting-mirrors 15, 17 are used to divert said secondary image-beams 14, 22 respectively towards a polarization-preserving projection-screen 3 such as a silver-screen or otherwise and said primary and secondary image-beams 13, 14, 22 are then arranged so as to partially overlap so that they mutually combine in order to recreate a complete image on the surface of said projection-screen 3. Moreover, said reflecting-mirrors 15, 17 may or may not be partially deformed in order to assist with the accurate alignment of said primary and secondary image-beams 13, 14, 22 on the surface of said projection-screen 3 thereto.

In such way, both polarization components comprising the original incident image-beam 11 are thereby utilized in order to generate the complete on-screen image, hence increasing the overall image brightness. It will also be understood by one skilled in the art that the resulting optical-path-length difference between said primary and secondary image-beams 13, 14, 22 is now significantly reduced as compared to other prior-art technologies, hence mitigating the necessity of utilizing an additional telephoto-lens pair or similar element in order to compensate for said optical-path-length difference and reducing the overall complexity and cost of the system.

The beam-splitting element 18 may for example comprise of two pieces Wire-Grid-Polarizer (WGP) plates placed together along one edge and mutually aligned at an angle of approximately 90 degrees. Moreover, in order to minimize the resulting gap in-between said plates, the two connecting edges may additionally be beveled (not shown) at an angle of approximately 45 degrees to enable said plates to be placed together in close proximity.

Alternatively, the beam-splitting element 18 may for example instead comprise of two pieces Polarization-Beam-Splitting (PBS) cubes bonded together (not shown) and arranged such that the two beam-splitting surfaces within said cubes are mutually aligned at an angle of approximately 90 degrees. Other beam-splitting elements may also be used in order to achieve the described effect without departing from the inventive idea disclosed herein.

Polarization modulators 16, 10, 19 are then placed within the optical-paths for each of said primary and secondary image-beams 13, 14, 22 respectively and arranged so as to modulate the linear polarization states of said image-beams between a first and second circular polarization state in response to a driving signal (not shown).

Furthermore, said polarization modulators 16, 10, 19 are arranged such that all left eye-images generated by said projector 1 are imparted with a first state of circular polarization and all right-eye images are imparted with a second state of circular polarization, with said first and second states of circular polarization being mutually orthogonal, thereby enabling time-multiplexed stereoscopic 3d images to be viewed on the surface of said projection-screen 3 via utilization of passive circular-polarized viewing-goggles (not shown).

A preferred embodiment of the present invention is that said polarization modulators 16, 10, 19 each comprise a stack of two individual pi-cells (not shown) arranged in mutually crossed orientation. Here, each pi-cell can for example be switched between a first optical-state possessing zero retardation when being operated with high voltage (eg. 25 volt), and a second optical-state possessing a retardation value close to approximately 140 nm when being operated with low voltage (eg. 3 volt), respectively.

Moreover, by operating said pi-cells mutually out-of-phase such that when said first pi-cell is operated with high voltage then said second pi-cell is simultaneously operated with low voltage and vice versa, then it will be understood by one skilled in the art that said polarization modulator will thus be capable of rapidly modulating the linear polarization states of said primary and secondary image-beams 13, 14, 22 between a left and right circular polarization state.

However, it will also be understood by one skilled in the art that when the linear polarization state of one of said primary and secondary image-beams at the input surface of one of said polarization modulators 16, 10, 19 respectively is aligned parallel with the transmission axis of the linear polarization-filters present in the lenses of said circular-polarized viewing-goggles, then according to the state of the art one of said lenses will normally be unable to fully block all wavelengths of light, thereby resulting in the generation of a high level of ghosting or crosstalk when viewing time-multiplexed stereoscopic 3d images.

However, it is disclosed that a preferred embodiment of the present invention occurs when the linear polarization states of both secondary image-beams 14, 22 at the input surfaces of said polarization modulators 10, 19 respectively are aligned parallel with the linear polarization-filters present in the lenses of said passive circular-polarized viewing-goggles. In such case, it is disclosed according to an embodiment of the present invention that contrast enhancement films 20, 21 are located at the exit surfaces of each of said polarization modulators 10, 19 respectively and designed so as to perturb and improve the degree of circular polarization of the two secondary image-beams exiting said polarization modulators without changing the overall states of circular polarization for said secondary image-beams, thereby increasing the level of light blocking achievable by said viewing-goggles and reducing the overall level of ghosting or crosstalk whilst maintaining the resulting on-screen image-brightness at a high level.

Moreover, according to a further aspect of the present invention, it is disclosed that said contrast enhancement films 20, 21 both comprise a stack of at least three separate uniaxially stretched retardation-films 20a, 20b, 20c and 21a, 21b, 21c respectively bonded together using optical adhesive or otherwise and with each retardation-film possessing an individual in-plane retardation value substantially equal to one of either 140 nm, 270 nm or 540 nm respectively.

The specific design for each contrast enhancement film 20, 21 is characterized by each separate retardation-film 20a, 20b, 20c and 21a, 21b, 21c possessing a specific value of retardation (given in units of nanometers) and orientation of optical-axis (given in units of degrees) and said contrast enhancement films 20, 21 are optimized so as to maximize the degree of circular-polarization of said secondary image-beams 14, 22 exiting said polarization modulators 10, 19 respectively. In such way, said contrast enhancement films 20, 21 are able to reduce the overall level of ghosting or crosstalk when viewing time-multiplexed stereoscopic 3d images whilst maintaining the overall on-screen image brightness at a higher level as compared to other prior-art technologies.

Figure 4:
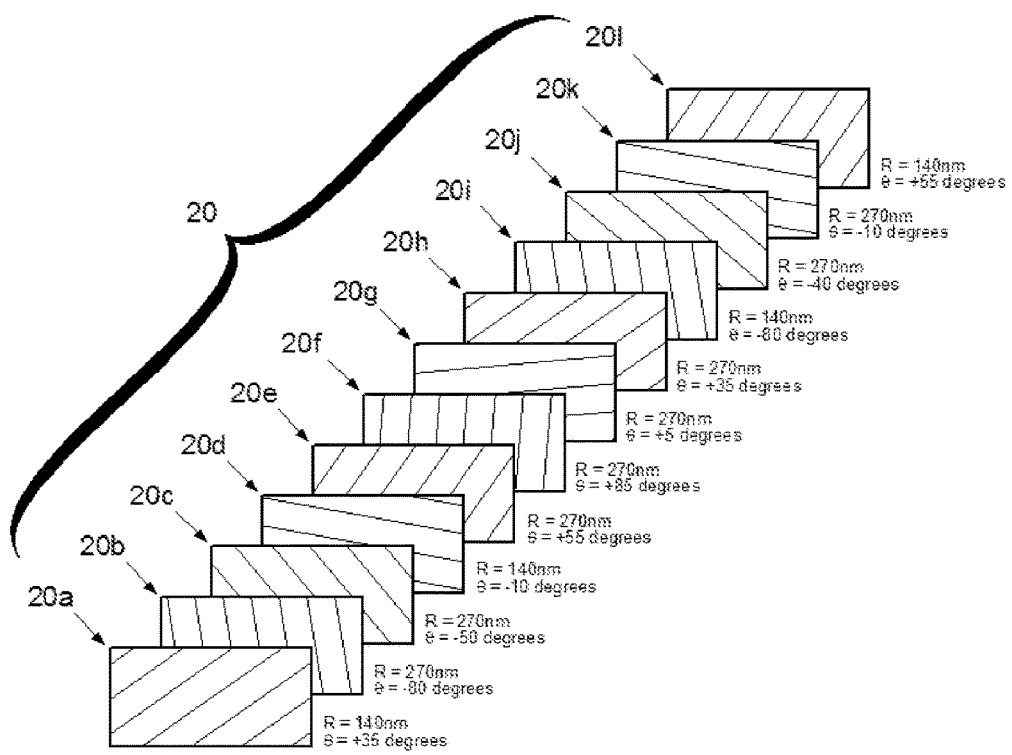
FIG. 4 shows a contrast enhancement film comprising a stack of at least three individual uniaxially stretched retardation-films bonded together according to a preferred embodiment of the present invention.

FIG. 4 shows an example of the design for said contrast enhancement film 20 according to a preferred embodiment of the present invention. Here, said contrast enhancement film 20 comprises a stack of twelve (12) separate uniaxially stretched retardation-films 20a-1 bonded together. Furthermore, each separate retardation-film 20a-1 individually possesses an in-plane retardation value substantially equal to one of either 140 nm, 270 nm or 540 nm respectively and the optical-axis for each separate retardation-film 20a-1 are individually aligned at the specified angles disclosed herein according to one aspect of the present invention in order to optimize the overall performance of said contrast enhancement film 20.

Moreover, in the example herein said retardation-films 20b,c,e,f,g,h,j,k possess an in-plane retardation value equal to substantially 270 nm, whilst said retardation-films 20a, d,i,l possess an in-plane retardation value equal to substantially 140 nm. However, it will be understood by one skilled in the art that other combinations of individual retardation-films may also be used in order to achieve similar results without departing from the inventive idea. It will also be understood the individual retardation-films could also be placed together in series without being mutually bonded together using an optical adhesive or alternatively located at separate positions within the optical-paths of said primary and secondary image-beams without departing from the inventive idea.

Furthermore, a preferred embodiment of the present invention occurs when said contrast enhancement films 20, 21 are bonded to the exit surfaces of each of said polarization modulators 10, 19 respectively. However, it will be understood that said contrast enhancement films 20, 21 could instead be located elsewhere between the exit surfaces of said polarization modulators 10, 19 and said projection-screen 3 without departing from the disclosed invention. For example, at least one of said contrast enhancement films 20, 21 could instead be incorporated within separate exit-windows (not shown) that may or may not be present.

It should also be understood that if instead the linear polarization state of the primary image-beam 13 is arranged so as to be parallel with the transmission axis of the linear polarization-filters present in the lenses of said passive circular-polarized viewing-goggles, then in this case a single contrast enhancement film will instead be required to be located at the exit surface of said polarization modulator 16 and placed within the optical-path of said primary image-beam 13, with no additional contrast enhancement films being required for either of the two secondary image-beams 14, 22 thereto. However, such arrangement is also disclosed herein and incorporated as a further embodiment of the present invention.

Whilst preferred embodiments of the present invention have been shown and described herein, various modifications may be made thereto without departing from the inventive idea of the present invention. Accordingly, it is to be understood that the present invention has been described by way of illustration and not limitation.

The invention claimed is:

1. A time-multiplexed stereoscopic 3d projection system for projecting a randomly polarized incident image-beam generated by a single-lens projector onto a polarization-preserving projection-screen, the system comprising:
    a beam-splitting element operable to split the randomly polarized incident image-beam generated by the single-lens projector into one primary image-beam, having a primary image-beam path, possessing a first state of linear polarization and two secondary image-beams, each having respective secondary image-beam paths, both possessing a second state of linear polarization, said first and second states of linear polarization being mutually orthogonal and said secondary image-beam paths for said secondary image-beams both being diverted by reflecting-surfaces such that said primary and secondary image-beams partially overlap and mutually recombine to form a complete image on the surface of the polarization-preserving projection-screen;
    a polarization modulator, disposed in each of the primary image-beam path and the two secondary image-beam paths, configured to modulate said first and second states of linear polarization between a left and right circular polarization state in synchronization with images generated by said projector;
    a contrast enhancement film disposed within the optical-path of at least one of said primary and secondary image-beams and positioned between the associated polarization modulator and the projection-screen;
    wherein said contrast enhancement film comprises a stack of at least three separate uniaxially stretched retardation-films configured to perturb the circular polarization state of the at least one of said primary and secondary image-beams;
    and wherein said uniaxially stretched retardation-films each individually possess an in-plane retardation value being substantially equal to one of 140 nm, 270 nm, or 540 nm.

2. The system of claim 1 wherein said uniaxially stretched retardation-films each have an optical axis aligned at a specified angle, wherein at least two of said uniaxially stretched retardation-films have optical axes aligned at different angles.

3. The system of claim 1 wherein said polarization modulators have an exit surface through which the primary and secondary image-beams respectively pass and where said contrast enhancement film is located in proximity to the exit surface of its associated polarization modulator.

4. The system of claim 3 wherein said contrast enhancement film is bonded to the exit surface of its associated polarization modulator.

5. The system of claim 3 wherein said contrast enhancement film is located in proximity to the polarization modulator in the primary image-beam path wherein the linear polarization state of the primary image beam is configured to be parallel with a transmission axis of a linear polarization filter present in passive circular-polarized viewing-goggles.

6. The system of claim 3 further including contrast enhancement films located at the exit surfaces of each of said polarization modulators.

7. The system of claim 6 wherein said contrast enhancement films are bonded to the exit surfaces of their associated polarization modulator.

8. The system of claim 1 wherein said uniaxially stretched retardation-films of said contrast enhancement film are bonded together using an optical adhesive.

9. The system of claim 1 wherein said polarization modulators each comprise a stack of two individual pi-cell liquid crystal elements placed together in series.

10. The system of claim 9 wherein said two individual pi-cell liquid crystal elements are arranged to be in mutually crossed orientation and are switched between a first optical processing state and a second optical processing state.

11. The system of claim 10 wherein said first optical processing state and said second optical processing state cause the primary image-beam and the two secondary image-beams to be modulated between a left and a right circular polarization state, respectively.

12. A contrast enhancement film for placement within the optical-path of an image-beam exiting a polarization modulator, the contrast enhancement film configured to perturb the circular polarization state of the image-beam, said contrast enhancement film comprising:
a stack of at least three separate uniaxially stretched retardation-films;
wherein said uniaxially stretched retardation-films each individually possess an in-plane retardation value being substantially equal to one of 140 nm, 270 nm, or 540 nm; and
wherein said uniaxially stretched retardation-films each have an optical axis aligned at a specified angle, wherein at least two of said uniaxially stretched retardation-films have optical axes aligned at different angles.

13. The system of claim 12 wherein said uniaxially stretched retardation-films of said contrast enhancement film are bonded together using an optical adhesive.

14. A time-multiplexed stereoscopic 3d projection method for projecting a randomly polarized incident image-beam generated by a single-lens projector onto a polarization-preserving projection-screen, the method comprising:
Splitting, using a beam-splitting element, the randomly polarized incident image-beam generated by said single-lens projector into one primary image-beam, having a primary image-beam path, possessing a first state of linear polarization and two secondary image-beams, each having respective secondary image-beam paths, both possessing a second state of linear polarization, said first and second states of linear polarization being mutually orthogonal and said secondary image-beam paths for said secondary image-beams both being diverted by reflecting-surfaces such that said primary and secondary image-beams partially overlap and mutually recombine to form a complete image on the surface of the polarization-preserving projection-screen;
modulating, using a polarization modulator disposed in each of the primary image-beam path and the two secondary image-beam paths, said first and second states of linear polarization between a left and right circular polarization state in synchronization with images generated by the projector;
disposing a contrast enhancement film within the optical-path of at least one of said primary and secondary image-beams positioned between the associated polarization modulator and the projection-screen;
wherein said contrast enhancement film comprises a stack of at least three separate uniaxially stretched retardation-films configured to perturb the circular polarization state of the at least one of said primary and secondary image-beams;
and wherein said uniaxially stretched retardation-films each individually possess an in-plane retardation value being substantially equal to one of 140 nm, 270 nm, or 540 nm.

15. The method of claim 14 further including aligning each of the optical axes of said uniaxially stretched retardation-film at a specified angle, wherein at least two of said uniaxially stretched retardation-films have optical axes aligned at different angles.

16. The method of claim 14 wherein disposing a contrast enhancement film includes disposing said film on an exit surface of said polarization modulator.

17. The method of claim 16 further including bonding said contrast enhancement film to the exit surface of the polarization modulator.

18. The method of claim 16 further including disposing said contrast enhancement film in proximity to the polarization modulator in the primary image-beam path and configuring the linear polarization state of the primary image-beam to be parallel with a transmission axis of a linear polarization filter present in passive circular-polarized viewing-goggles.

19. The method of claim 16 further including disposing contrast enhancement films at the exit surfaces of each of said polarization modulators.

20. The method of claim 19 further including bonding said contrast enhancement films to the exit surfaces of their associated polarization modulators.

21. The method of claim 19 wherein the step of bonding involves using an optical adhesive.

22. The method of claim 14 wherein said polarization modulators each comprise a stack of two individual pi-cell liquid crystal elements placed together in series.

23. The method of claim 22 wherein said two individual pi-cell liquid crystal elements are arranged to be in mutually crossed orientation and are switched between a first optical processing state and a second optical processing state.

24. The method of claim 23 wherein said first optical processing state and said second optical processing state cause the primary image-beam and the two secondary image-beams to be modulated between a left and a right circular polarization state, respectively.

25. A method for perturbing the circular polarization state of an image-beam having an optical-path exiting a polarization modulator, the method comprising:
placing a contrast enhancement film comprising at least three separate uniaxially stretched retardation-films within the optical-path of the image-beam exiting a polarization modulator; wherein said uniaxially stretched retardation-films each individually possess an in-plane retardation value being substantially equal to one of 140 nm, 270 nm, or 540 nm; and
aligning the optical axes of each said uniaxially stretched retardation-film at specified angles, wherein at least two of said uniaxially stretched retardation-films have 35 optical axes aligned at different angles.

26. The method of claim 25 further including bonding together, using an optical adhesive, said at least three uniaxially stretched retardation-films of said contrast enhancement film.

* * * * *